US006036326A

United States Patent [19]

Yoshikawa et al.

[11] Patent Number: 6,036,326

[45] Date of Patent: Mar. 14, 2000

[54] ILLUMINATED RESINOUS BUTTON KEY WITH OPTICAL MEANS FOR HIGHLIGHTING CHARACTER FORMED ON THE KEY

[75] Inventors: Hiroshi Yoshikawa; Tsutomu Takahashi; Tamotsu Koike, all of Tokyo, Japan

[73] Assignee: Fujitsu Takamisawa Component Limited, Tokyo, Japan

[21] Appl. No.: 09/028,785

[22] Filed: Feb. 24, 1998

[30] Foreign Application Priority Data

Feb. 25, 1997 [JP] Japan .................................... 9-041157

[51] Int. Cl.$^{7}$ .............................. G01D 11/28; H01H 9/00

[52] U.S. Cl. ................................ 362/23; 362/24; 362/84; 362/85; 362/260; 200/310; 200/311; 200/313; 200/314; 40/542

[58] Field of Search ................................. 362/23, 24, 84, 362/85, 260; 200/310, 311, 313, 314; 40/542

[56] References Cited

U.S. PATENT DOCUMENTS

| | | | |
|---|---|---|---|
| 4,060,703 | 11/1977 | Everett, Jr. | 200/5 |
| 4,343,975 | 8/1982 | Sado | 200/314 |
| 4,449,023 | 5/1984 | Hilhorst et al. | 200/159 B |
| 5,073,843 | 12/1991 | Magee | 362/84 |
| 5,120,920 | 6/1992 | Moriike | 200/341 |
| 5,477,430 | 12/1995 | Larose | 362/84 |
| 5,655,826 | 8/1997 | Kuono et al. | 362/24 |

FOREIGN PATENT DOCUMENTS

| | | |
|---|---|---|
| 3-57831 | 6/1991 | Japan . |
| 4-38857 | 2/1992 | Japan . |
| 4-116955 | 4/1992 | Japan . |
| 5-16581 | 1/1993 | Japan . |
| 5-314855 | 11/1993 | Japan . |
| 8-174716 | 7/1996 | Japan . |
| 5-347111 | 9/1996 | Japan . |

*Primary Examiner*—Sandra O'Shea
*Assistant Examiner*—Ronald E. DelGizzi
*Attorney, Agent, or Firm*—Staas & Halsey, LLP

[57] ABSTRACT

A resinous member with a character visually arranged therein, including a resinous body, a character formed by a laser beam machining on a surface of the body, and a light transmittable coating arranged on the surface of the body for covering at least the character. The light transmittable coating is provided with a generally uniform thickness to form a roughened outer surface substantially corresponding to a machined surface of the character. The light transmittable coating may be formed through a spray coating process. The resinous member may be used as a key top member of a key in a keyboard of an electronic machine. The key top member comprises a resinous body, a character arranged on a surface of the body, and optical means arranged in association with the character for highlighting the character in an optical manner using an external light. The optical means may comprise a phosphorescent or fluorescent member.

18 Claims, 9 Drawing Sheets

ILLUMINATED RESINOUS BUTTON KEY WITH OPTICAL MEANS FOR HIGHLIGHTING CHARACTER FORMED ON THE KEY

BACKGROUND OF THE INVENTION

1. Field of the Invention

The present invention relates generally to a resinous member with characters, letters, figures, etc., visually arranged therein, and more particularly to a key top member, comprising a resinous member, of a key used in a keyboard as a data input device of an electronic machine.

2. Description of the Related Art

Demands for the multi-function or flexibility of electronic machines causes various requirements for keyboards of the electronic machines, such as an improvement in the visibility of characters provided on the surface of a key. Especially, in portable electronic machines, it is desired to more easily operate the key even in a dark place.

Conventionally, various methods have been used to provide the characters, etc. on the surface of a key top member of the key, such as a two-color molding process, or a sublimation, a pad printing or a laser beam machining on the surface of a resinous member. These methods have been selectively used in accordance with a cost requirement, a manufacturing scale, an application purpose, or the like. Also, attempts have been made in these methods to improve the visibility of the key top member or of the characters provided on the key top member.

Japanese Unexamined Patent Publication (Kokai) No. 8-174716 (JPP'716) discloses a key top member of a key used in a keyboard, which can improve the visibility of a character. As shown in FIG. 1A, the key top member 1 includes a resinous molded part 2 with a top surface 3 slanted by an angle θ, a sheet 4 mounted on the top surface 3, a character 5 printed on the sheet 4, and a transparent resinous molded piece 6 formed on the top surface 3 to cover the sheet 4. A contact part 7 is formed on a bottom surface of the key top member 1 to bring conductors (not shown) into contact with each other. A skirt 8 is elastically deformed by pushing down the key top member 1. The slanted top surface 3 of the resinous molded part 2 can improve the visibility of the character 5 upon being looked at from the front side of the keyboard.

JPP'716 also discloses another key top member which can improve the visibility of a character. As shown in FIG. 1B, the key top member 1 includes a resinous molded part 9 with a top surface 3 slanted by an angle θ, which is made of a material causing a color development by a laser beam irradiation, and a transparent resinous molded piece 6 formed on the top surface 3 and having a top surface generally parallel to the top surface 3. After molding the transparent piece 6 on the molded part 9, a laser beam is irradiated on the top surface 3 to cause a color development of a coloring matter contained in the material of the molded part 9 and to form a character 10. This key top member 1 can also improve the visibility of the character 10 upon being looked at from the front side of the keyboard.

Japanese Unexamined Utility Model Publication (Kokai) No. 3-57831 (JUMP'831) discloses a key top member of a push-button switch mechanism, which can improve the visibility of a key top member in a dark place. As shown in FIG. 1C, a key top member 1, a light source 11, a light guide member 12 and a switch 17 are accommodated in a casing 18. The key top member 1 is provided with a light guide part 13, a peripheral shading part 14, a top phosphor part 15 and a bottom light reflecting surface 16. Light "L" emitted from the light source 11 passes through the light guide member 12 and enters into the light guide part 13. Then, the light "L" is reflected by the light reflecting surface 16 and irradiates the phosphor part 15. The light source 11 intermittently emits light, and the afterglow of the phosphor part 15 is used to visually observe the key top member 1.

Japanese Unexamined Patent Publication (Kokai) No. 5-314855 (JPP'855) also discloses a key top member of a push-button switch mechanism, which can improve the visibility of a key top member in a dark place. As shown in FIG. 1D, a key top member 1 made of a light guide material 19 is mounted in a hole of a casing 18, and a phosphor part 15 is provided on the upper surface of the casing 18 to surround the hole. Light "L" emitted from a light source 11 passes through the light guide member 20 and enters into the light guide material 19. Then, the light "L" is emitted from the key top member 1 and thus the key top member 1 can be visually observed. A part of the light "L" emitted from the key top member 1 and an external light (not shown) irradiate the phosphor part 15 and are stored in the latter. When the light source 11 does not emit light, the key top member 1 is illuminated by the afterglow of the phosphor part 15, and can be visually observed in a dark place.

In another technical field, different from the field of the above key top members, it is well known that a resinous member, such as a package of an electronic part, is provided with characters for representing, e.g., a rating. Such characters to be provided on the package are also formed by irradiating the resinous member with a laser beam, because of the easy formation of the characters.

Japanese Unexamined Patent Publication (Kokai) No. 4-38857 (JPP'857) discloses a package of a semiconductor. As shown in FIG. 2A, a black resinous molded package 21 accommodating a semiconductor (not shown) having leads 22 is provided with grooves 23 for representing characters. The grooves 23 are formed by irradiating the top surface of the package 21 with a laser beam. To improve the visibility of the characters, the surface of the black package 21 is covered by an yellow resinous layer 24, as shown in FIG. 2B. When the yellow layer 24 is cut out or engraved by a laser beam, the black package 21 is exposed at cut-out portions 25, and thus black characters are formed on an yellow ground, whereby the excellent visibility of the characters can be obtained.

Japanese Unexamined Patent Publication (Kokai) No. 4-116955 (JPP'955) also discloses a package of a semiconductor. As shown in FIG. 2C, a resinous molded package 21 accommodating a semiconductor (not shown) having leads 22 is provided on the top surface of the package with grooves for representing characters, and is covered on the top surface by a transparent resinous coating 26. When a vacuum nozzle (not shown) used for mounting the package 21 onto a circuit board, the grooves formed by a laser beam on the top surface of the package 21 tend to make a gap between the top surface and the vacuum nozzle to reduce a suction force of the vacuum nozzle. The coating 26 acts to eliminate this problem.

Japanese Unexamined Patent Publication (Kokai) No. 5-16581 (JPP'581) discloses a method for providing characters on the surface of a card. The card includes a protective layer 27*a* and a magnetic recording layer 27*e*. Between these layers 27*a* and 27*e*, some layers 27*b* to 27*d* made of resin or metal having different colors are arranged. The laminated structure thus formed is provided with grooves 28*a* to 28*c* with different depths, formed by irradiating the laminated structure with differently powered laser beam. Thus the bottoms of the grooves 28*a* to 28*c* respectively leach differently colored layers 27*b* to 27*d*, and thereby the visibility of the characters represented by the grooves 28*a*–28*c* is improved.

The above-mentioned conventional techniques, for improving the visibility of the characters formed on a resinous molded member by a laser beam machining, have certain problems. For example, in the techniques disclosed in JPP'857 and JPP'581, the visibility of the characters is improved by irradiating a laminated structure having differently colored laminations with differently powered laser beam to form differently colored characters. However, these techniques have a common problem that a manufacturing cost is increased. Also, the technique, as disclosed in JPP'716, for causing a color development of a coloring matter contained in the material of a pale-colored resinous molded member by a laser beam irradiation, or for coloring the surface of the resinous molded member by darkening or carbonizing the material thereof, relatively simply forms a character. However, in this technique, the density of the character is insufficient, and thus it has been required to improve the visibility of the colored character.

On the other hand, the above-mentioned conventional techniques, for improving the visibility of the characters formed on a key top member in a dark place, have also certain problems. For example, in the techniques disclosed in JUMP'831 and JPP'855, the visibility of the characters in a dark place is improved by irradiating a key top member and a phosphor part with light emitted by a light source. However, these techniques have common problems, in portable use, in that the number of components is increased due to the light source, etc., and that electric power is consumed for illuminating the light source. Thus, it has been required to improve the visibility of the character formed on the key top member in a dark place, without using any electrically powered light source for illuminating the key top member.

SUMMARY OF THE INVENTION

It is therefore an object of the present invention to provide a resinous member or a key top member, which can improve the visibility of the characters formed on the surface of the member, without increasing the manufacturing cost of the member.

Another object of the present invention is to provide a resinous member, or a key top member, which can improve the visibility, in a dark place, of the characters visually arranged on the member, without using an electrically powered light source for illuminating the member.

In accordance with the present invention, there is provided a resinous member with a character visually arranged therein, comprising a body made of a resin; a character formed by a laser beam machining on a surface of the body; and a light transmittable coating arranged on the surface of the body for covering at least the character, the light transmittable coating being provided with a generally uniform thickness to form a roughened outer surface substantially corresponding to a machined surface of the character.

The character may be structured as a groove engraved by the laser beam machining.

Alternatively, the character may be structured as a darkened ridge burnt by the laser beam machining.

The light transmittable coating may be formed through a spray coating process.

Alternatively, the light transmittable coating may be made of an ultraviolet-curing resin.

In another aspect of the invention, there is provided a key top member comprising a resinous member as mentioned above.

In another aspect of the invention, there is provided a key top member with a character visually arranged therein, comprising a body made of a resin; a character arranged on a surface of the body; and optical means arranged in association with the character for highlighting the character in an optical manner using an external light.

In a preferred aspect, the optical means comprises a phosphorescent member disposed adjacent to and around the character to highlight a profile of the character in a phosphorescent manner.

The character may be printed on the surface of the body, and the phosphorescent member may be mounted on the surface of the body to surround at least outer periphery of the character.

Alternatively, the character may be structured on the surface of the body as a darkened ridge burnt by a laser beam machining, and the phosphorescent member may be mounted on the surface of the body to surround at least outer periphery of the character.

The key top member may further comprise a light transmittable coating arranged on the surface of the body for covering at least the character and the phosphorescent member.

In another preferred aspect, the optical means comprises a fluorescent member disposed within the body, the fluorescent member being provided with major surfaces covered by the body and end surfaces smaller than the major surfaces, wherein at least a part of the body, having the surface of the body, is formed as a light transmittable part enabling the external light to be incident into the fluorescent member through at least one of the major surfaces, and wherein at least one of the end surfaces acts to highlight the character in a fluorescent manner.

The at least one of the end surfaces of the fluorescent member may be exposed on the surface of the body to be visually recognized as the character.

Alternatively, the at least one of the end surfaces of the fluorescent member may be exposed on the surface of the body, and the character may be arranged on or adjacent to the exposed at least one of the end surfaces to be visually recognized as a dark character with a profile thereof being highlighted.

The key top member may further comprise a light transmittable coating arranged on the surface of the body for covering at least the character and the exposed at least one of the end surfaces of the fluorescent member.

Alternatively, the at least one of the end surfaces of the fluorescent member may be covered by the light transmittable part of the body, and the character may be arranged adjacent to the covered at least one of the end surfaces to be visually recognized as a character with a profile thereof being highlighted.

BRIEF DESCRIPTION OF THE DRAWINGS

The above and other objects, features, and advantages of the present invention will become more apparent from the following description of preferred embodiments in connection with the accompanying drawings, in which.

DESCRIPTION OF THE PREFERRED EMBODIMENT

Figure 1A:
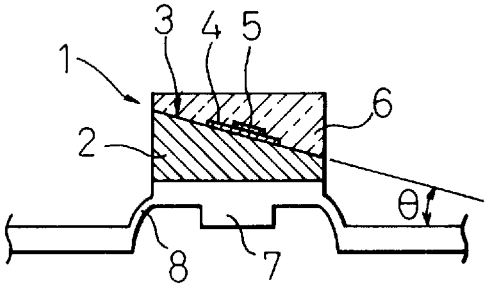
Fig.1A PRIOR ART
FIGS. 1A to 1D are vertical sectional views respectively showing conventional key top members.
Figure 1B:
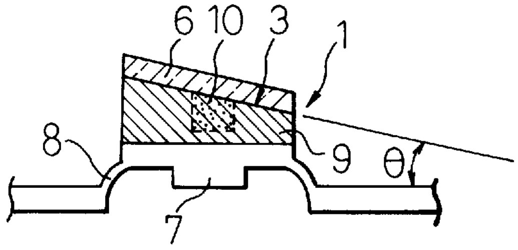
Fig.1B PRIOR ART
Figure 1C:
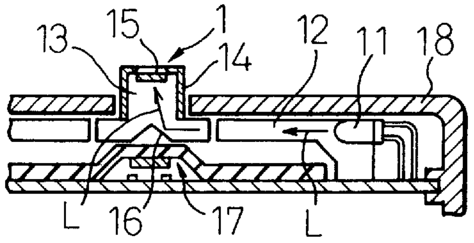
Fig.1C PRIOR ART
Figure 1D:
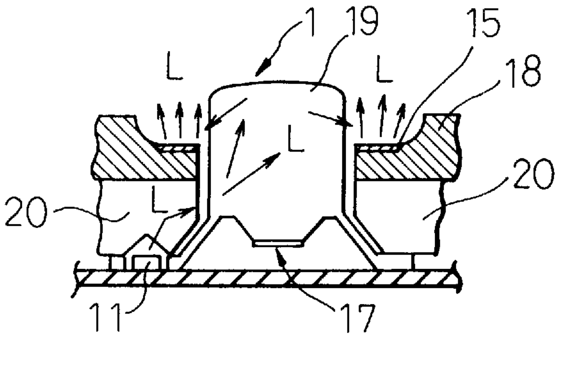
Fig.1D PRIOR ART
Figure 2A:
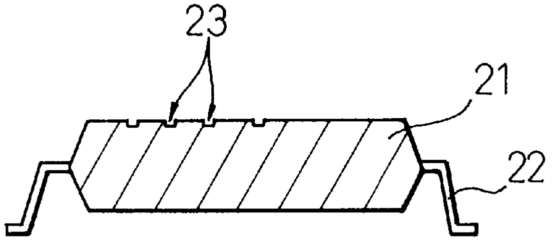
Fig. 2A PRIOR ART
FIGS. 2A to 2D are vertical sectional views respectively showing conventional resinous packages of electric parts.
Figure 2B:
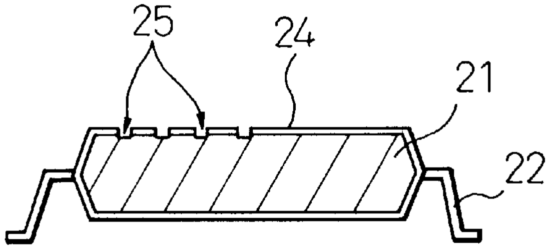
Fig. 2B PRIOR ART
Figure 2C:
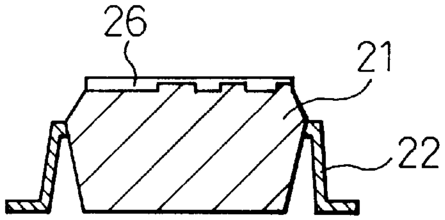
Fig. 2C PRIOR ART
Figure 2D:
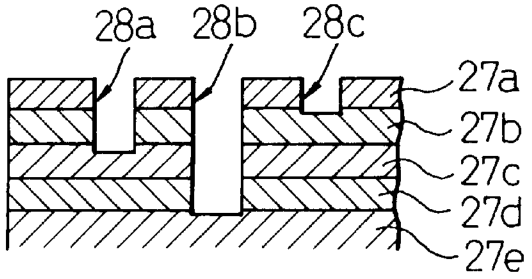
Fig. 2D PRIOR ART
Figure 3A:
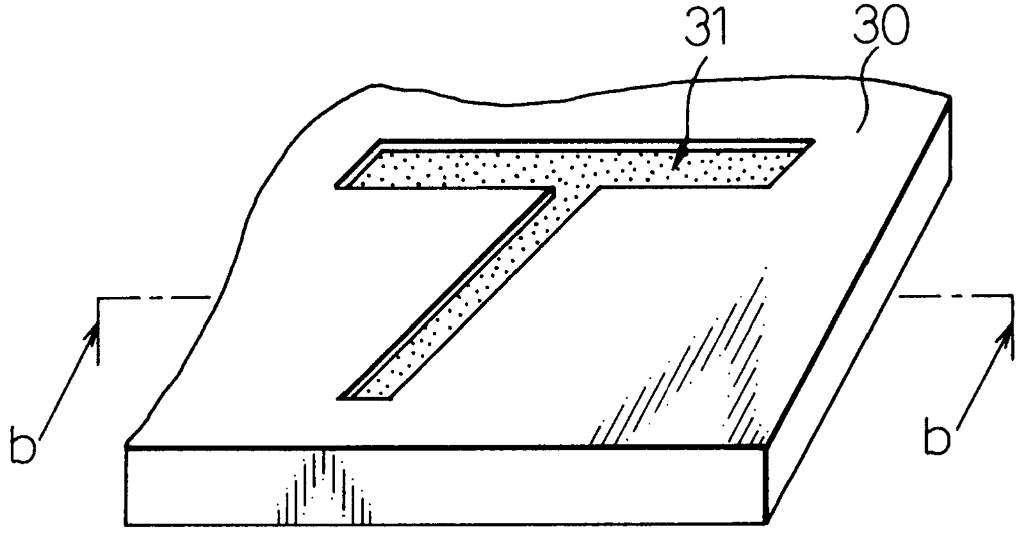
FIG. 3A is a perspective view of a resinous member with a character visually arranged therein, according to the first embodiment of the present invention.

Referring now to the drawings, in which the same or similar components are denoted by the same reference numerals, FIG. 3A shows a resinous member with a character visually arranged therein, according to the first embodiment of the present invention, which can improve the visibility of the character. The resinous member of the first embodiment may be used for a package of an electronic part, such as a semiconductor, for a key top member of a key used in a keyboard of an electronic machine, such as a computer, or for a casing of an electronic machine.

The resinous member shown in FIG. 3A includes a resinous body 30, which may be formed from a molded resin, and a groove 31 representing a character "T", which is formed or engraved by a laser beam machining or marking on the upper surface of the body 30. When this type of conventional resinous member is used as a black package of a semiconductor, the character represented by the groove is normally visually recognized by observing the recessed shape of the character and the irregular light reflection on the roughened bottom surface of the groove formed due to the laser beam machining. However, such a visual recognition may often be difficult due to an ambient light condition surrounding the package.

Figure 3B:
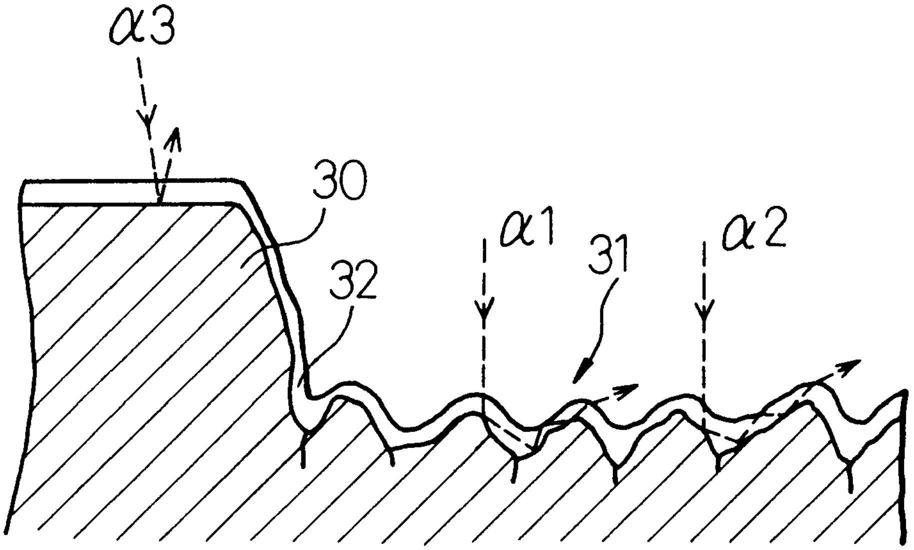
FIG. 3B is an enlarged vertical sectional view taken along line b—b in FIG. 3A, partially showing the portion of the character of the resinous member.

To eliminate this problem, in the first embodiment of the present invention, the upper surface of the resinous body 30 is covered by a light transmittable resinous coating 32, as shown in FIG. 3B. The light transmittable coating 32 has a generally uniform thickness over substantially the entire area of the upper surface of the resinous body 30. Particularly in the area on the groove 31, the upper surface of the light transmittable coating 32 is formed as a roughened surface substantially corresponding to the roughened bottom surface of the groove 31, as clearly shown in FIG. 3B.

The light transmittable resinous coating 32 having the above characteristic structure allows lights ($\alpha 1$, $\alpha 2$), incident into the light transmittable coating 32 located on the groove 31, to be reflected in a multiple reflection manner between the roughened bottom surface of the groove 31 in the resinous body 30 and the roughened upper surface of the light transmittable coating 32, as shown in FIG. 3B, and thus the incident lights gradually attenuate. On the other hand, in the area outside the groove 31, light ($\alpha 3$) being incident into the light transmittable coating 32 is reflected in a direct reflection manner by the flat upper surface of the resinous body 30 and is transmitted throughout the light transmittable coating 32.

In this manner, lights reflected by the upper surface of the resinous body 30 in the roughened surface area of the groove 31 and in the flat surface area outside thereof are clearly differently observed relative to each other due to the provision of the light transmittable resinous coating 32, and thereby the visibility of the character provided on the upper surface of the resinous body 30 is effectively improved. It should be noted that the color of the resinous body 30 is not limited to black, and the other various colors including white may be provided to the resinous body 30 to obtain the above-mentioned effect.

Figure 4A:
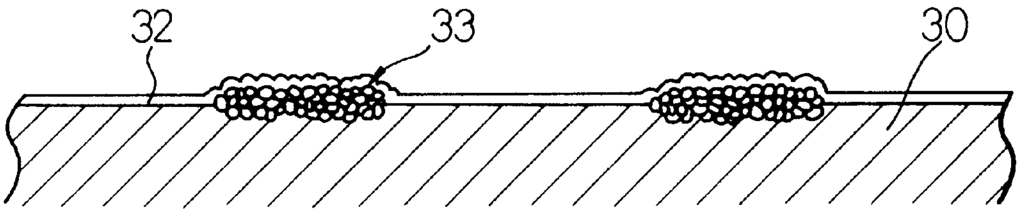
FIG. 4A is a vertical sectional view of a resinous member with a character visually arranged therein, according to the second embodiment of the present invention.

FIG. 4A shows in a vertical section a resinous member with a character visually arranged therein, according to the second embodiment of the present invention, which can also improve the visibility of the character. The resinous member of the second embodiment may also be used for a package of an electronic part, such as a semiconductor, for a key top member of a key used in a keyboard of an electronic machine, such as a computer, or for a casing of an electronic machine.

The resinous member shown in FIG. 4A includes a pale color resinous body 30, which may be formed from a molded resin, and a darkened ridge 33 representing a character, which is formed or burnt by a laser beam machining or marking on the upper surface of the body 30. In this embodiment, the resinous body 30 is made of a material containing a carbon. This type of conventional resinous member also has a problem in that a visual recognition of the character represented by the darkened ridge may often be difficult due to an ambient light condition surrounding the resinous member.

To eliminate this problem, in the second embodiment of the present invention, the upper surface of the resinous body 30 is also covered by a light transmittable resinous coating 32, as shown in FIG. 4A. The light transmittable coating 32 has a generally uniform thickness over substantially the entire area of the upper surface of the resinous body 30. Particularly in the area on the darkened ridge 33, the upper surface of the light transmittable coating 32 is formed as a roughened surface substantially corresponding to the upper machined surface of the darkened ridge 33, as clearly shown in FIG. 4B.

Figure 4B:
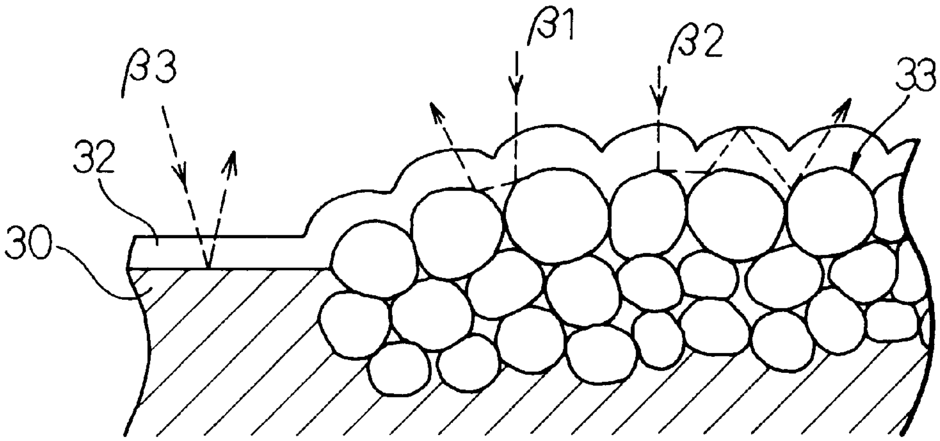
FIG. 4B is an enlarged vertical sectional view partially showing the character of the resinous member of FIG. 4A.

Thus, the light transmittable resinous coating 32 also allows lights (β1, β2), incident into the light transmittable coating 32 located on the darkened ridge 33, to be reflected in a multiple reflection manner between the roughened upper surface of the darkened ridge 33 in the resinous body 30 and the roughened upper surface of the light transmittable coating 32, as shown in FIG. 4B, and thus the incident lights gradually attenuate. On the other hand, in the area outside the darkened ridge 33, light (β3) being incident into the light transmittable coating 32 is reflected in a direct reflection manner by the flat upper surface of the resinous body 30 and is transmitted throughout the light transmittable coating 32.

In this manner, lights reflected by the upper surface of the resinous body 30 in the roughened surface area of the darkened ridge 33 and in the flat surface area outside thereof are clearly differently observed relative to each other due to the provision of the light transmittable resinous coating 32, and thereby the visibility of the character provided on the upper surface of the resinous body 30 is effectively improved.

In this respect, the optical density D of the darkened ridge 33 formed on the upper surface of the resinous body 30 is 0.95, when the light transmittable resinous coating 32 has a thickness of 15 μm. On the other hand, when the upper surface of the darkened ridge 33 is not covered by any coating, i.e., the light transmittable coating 32 is eliminated, the optical density D of the darkened ridge 33 is 0.75. Consequently, the visibility of the character represented by the darkened ridge 33 is effectively improved. It has been confirmed that the optical density D is increased when the light transmittable coating 32 has a thickness between 0.5 μm and 100 μm. It should be noted that the optimum thickness of the light transmittable coating 32, which can enhance this advantageous effect, depends on the degree of roughness of the upper surface of the darkened ridge 33.

It is preferred that such a characteristic structure of the light transmittable resinous coating 32, in the first and second embodiments of the present invention, is obtained by a spray coating process because of the easy handling thereof. In this case, it is advantageous that the light transmittable coating 32 is made of an ultraviolet-curing resin and is cured by an ultraviolet ray after being coated on the resinous body 30. Further, the light transmittable resinous coating 32 may be coated only on the area of the roughened surface of the character represented by the groove 31 or the darkened ridge 33. In this arrangement, the light transmittable coating 32 also can improve the visibility of the character in the same manner as the arrangement of the light transmittable coating 32 coated on the entire area of the upper surface of the resinous body 30.

Figure 5A:
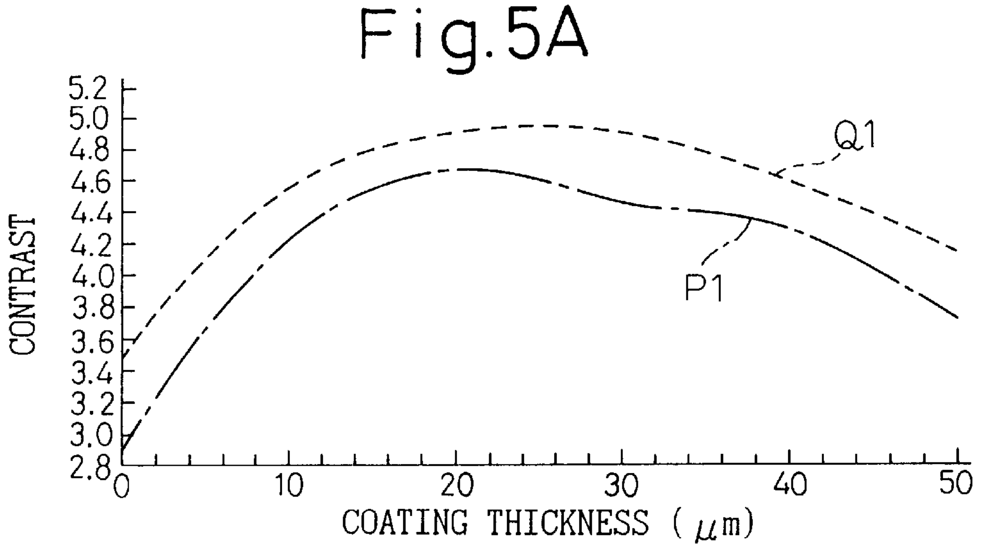
FIG. 5A illustrates "thickness/contrast" curves obtained from a light transmittable resinous layer used in the resinous member of FIG. 4A.
Figure 5B:
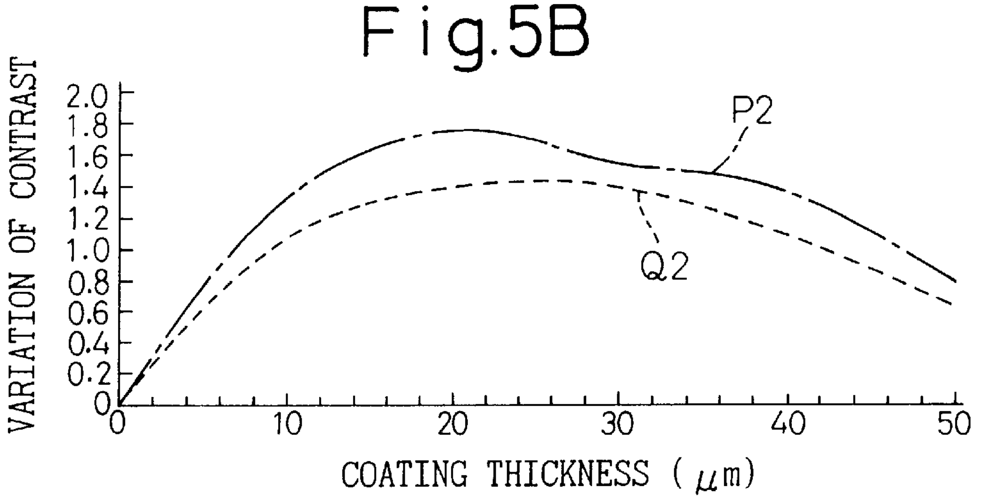
FIG. 5B illustrates "thickness/variation of contrast" curves corresponding to the respective curves in FIG. 5A.
Figure 5C:
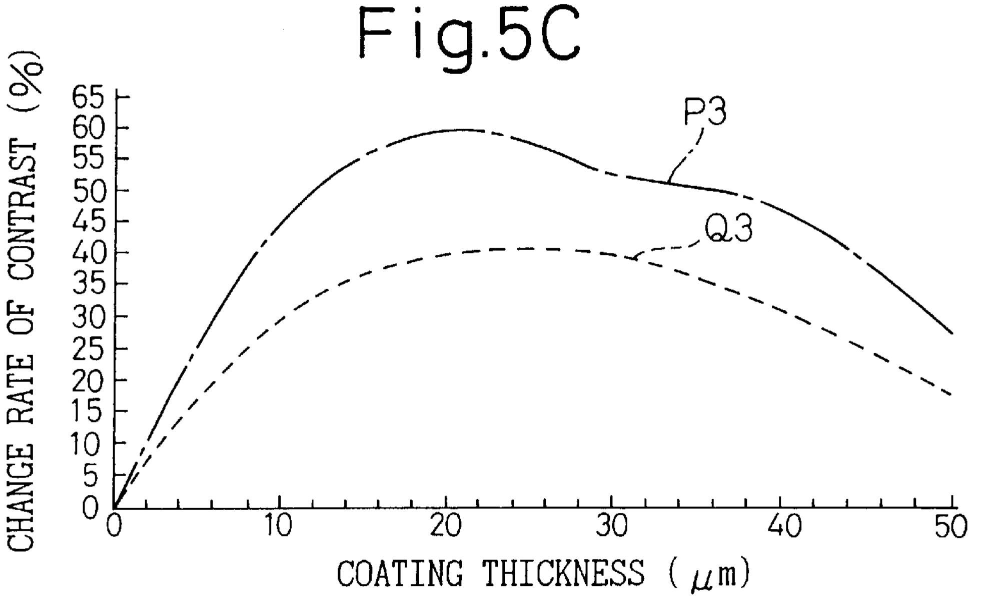
FIG. 5C illustrates "thickness/change rate of contrast" curves corresponding to the respective curves in FIG. 5A.

FIGS. 5A to 5C illustrate some curves for further clarifying the advantageous effect, as mentioned above, due to the light transmittable resinous coating 32 in the second embodiment. FIG. 5A shows two curves, each of which represents the relationship between the thickness (μm) of the light transmittable coating 32 and the contrast of the luminance (cd/m$^2$). The contrast is represented by a ratio of the luminance in the flat surface area of the resinous body 30 outside the darkened ridge 33 to the luminance in the roughened surface area of the darkened ridge 33. Thus, when the contrast is larger, the visibility of the character is more improved. A first curve "P1" shown by a chain line has a smaller initial value of the contrast ("initial value" means the value when the light transmittable coating 32 is not provided), and a second curve "Q1" shown by a broken line has a larger initial value of the contrast. In both curves, when the coating thickness is increased up to about 20 to 30 μm, the visibility of the character is improved, and when the thickness exceeds about 30 μm, the visibility of the character is deteriorated, that is, the character becomes unclear.

FIG. 5B shows two curves "P2" and "Q2" respectively corresponding to the curves "P1" and "Q1" of FIG. 5A, each of which represents the relationship between the thickness (μm) of the light transmittable resinous coating 32 and the variation of the contrast of every thickness with the initial value ((variation)=(contrast)−(initial value)). FIG. 5C shows two curves "P3" and "Q3" respectively corresponding to the curves "P1" and "Q1" of FIG. 5A, each of which represents the relationship between the thickness (μm) of the light transmittable coating 32 and the change rate (%) of the contrast of every thickness with the initial value ((change rate)=(variation)/(initial value)×100). As clearly shown in FIGS. 5B and 5C, the sample having smaller initial value can provide a superior effect due to the light transmittable coating 32.

As will be understood from the above description, the resinous member according to the present invention can improve the visibility of the character, formed by a laser beam machining or marking on the surface of the member, by a relatively simple structure without increasing the manufacturing cost of the member.

Figure 6A:
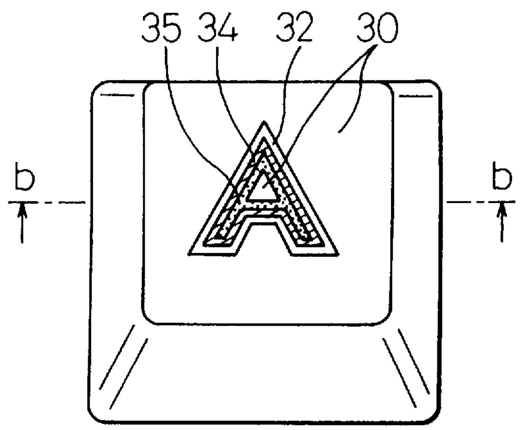
FIG. 6A is a plan view of a key top member with a character visually arranged therein, according to the third embodiment of the present invention.
Figure 6B:
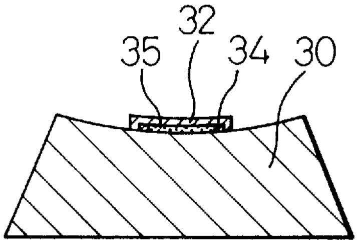
FIG. 6B is a vertical sectional view of the key top member, taken along line b—b of FIG. 6A.

FIGS. 6A and 6B show a key top member comprising a resinous body and a character visually arranged therein, according to the third embodiment of the present invention, which can improve the visibility of the character in a dark place. The key top member of the third embodiment includes a resinous body 30, which may be formed from a molded resin, a character 35 printed on the upper surface of the resinous body 30, a phosphorescent element 34 disposed adjacent to the outer periphery of the character 35 to surround the character 35, and a light transmittable resinous coating 32 protectively covering both the character 35 and the phosphorescent element 34.

The phosphorescent element 34 acts to illuminate the outer periphery of the character 35 with a phosphorescence or afterglow of the phosphorescent element 34. Consequently, the profile of the character 35 is highlighted, even if the intensity of the phosphorescence or afterglow is relatively low, whereby the visibility of the character 35 in a dark place is effectively improved. Also, according to this embodiment, provision of the phosphorescent element 34 to improve the visibility of the character 35 in a dark place eliminates the use of any electrically powered light source.

Figure 7A:
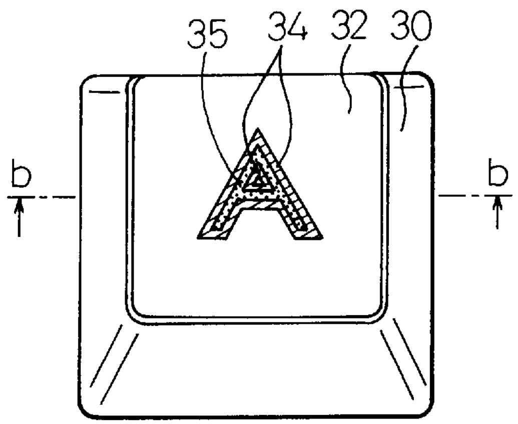
FIG. 7A is a plan view of a key top member with a character visually arranged therein, according to the fourth embodiment of the present invention.
Figure 7B:
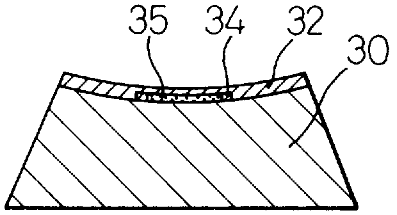
FIG. 7B is a vertical sectional view of the key top member, taken along line b—b of FIG. 7A.
Figure 8A:
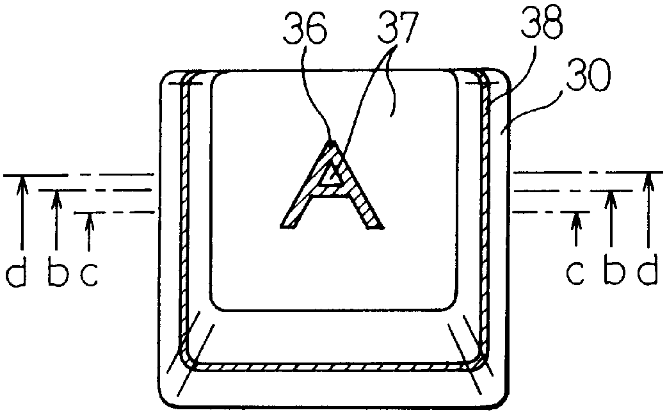
FIG. 8A is a plan view of a key top member with a character visually arranged therein, according to the fifth embodiment of the present invention.
Figure 8B:
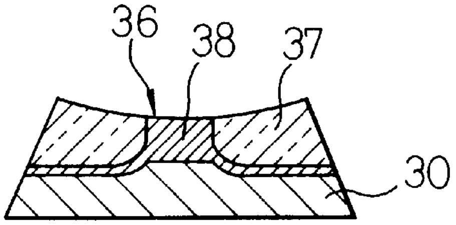
FIG. 8B is a vertical sectional view of the key top member, taken along line b—b of FIG. 8A.
Figure 8C:
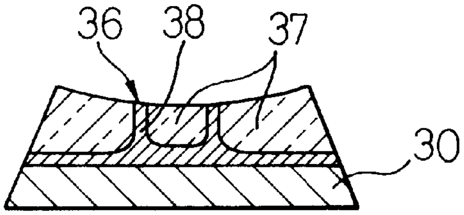
FIG. 8C is a vertical sectional view of the key top member, taken along line c—c of FIG. 8A.
Figure 8D:
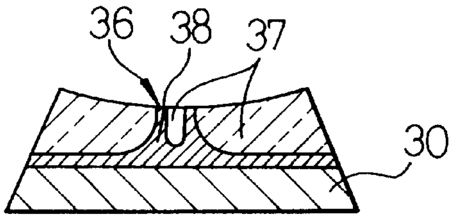
FIG. 8D is a vertical sectional view of the key top member, taken along line d—d of FIG. 8A.

FIGS. 7A and 7B show another key top member, according to the fourth embodiment of the present invention, which can improve the visibility of the character in a dark place. The key top member of the fourth embodiment includes a resinous body 30, which may be formed from a molded resin, a character 35 printed on the upper surface of the resinous body 30, phosphorescent elements 34 disposed adjacent to the inner and outer peripheries of the character 35 to entirely surround the character 35, and a light transmittable resinous coating 32 protectively covering the entire area of the upper surface of the resinous body 30. The phosphorescent elements 34 act to illuminate the inner and outer peripheries of the character 35 with a phosphorescence or afterglow of the phosphorescent elements 34. Consequently, the profile of the character 35 is more highlighted than in the third embodiment.

The phosphorescent element 34 in the third and fourth embodiments may be made by incorporating a vehicle into a material such as ZnS loaded with heavy metal, and may be arranged by, e.g., a printing process to surround the character 35. However, any other suitable material and/or process may be used. Also, it is preferred that the light transmittable resinous coating 32 in the third and fourth embodiments is formed by a spray coating process because of the easy handling thereof. In this case, it is advantageous that the light transmittable coating 32 is made of an ultraviolet-curing resin and is cured by an ultraviolet ray after being coated on the resinous body 30.

FIGS. 8A to 8D show a key top member comprising a resinous body and a character visually arranged therein, according to the fifth embodiment of the present invention, which can improve the visibility of the character in a dark place. The key top member of the fifth embodiment includes a resinous molded base part 30, a fluorescent part 38 mounted on the upper surface of the base part 30, and light transmittable upper parts 37 mounted on the fluorescent part 38. The fluorescent part 38 is made of a molded resin including a fluorescent material such as a fluorescent dye. The light transmittable upper parts 37 are made of a transparent or translucent molded resin.

The fluorescent part 38 includes a generally flat base section and an upwardly projecting section formed integrally with each other. The top surface 36 of the upwardly projecting section of the fluorescent part 38 is exposed between the adjacent upper surfaces of the light transmittable upper parts 37, to represent a character "A" at generally the center of the top surface of the key top member. The generally flat base section of the fluorescent part 38 extends between the base part 30 and the upper parts 37 up to the slanted lateral faces of the key top member.

Generally, a fluorescent resinous member including a fluorescent material emits light brighter than incident light. In particular, when the resinous member has a sheet or strip shape, most of the emitted light is reflected in a total internal reflection manner by relatively large major surfaces of the sheet or strip shaped member, to propagate through the member, and then is concentrically radiated from relatively small end surfaces of the member. In this manner, the relatively small end surfaces of the member are always visually observed as highlighted surfaces brighter than the major surfaces. That is, the end surfaces are highlighted in brighter than the major surfaces irrespective of the brightness of the ambient environment of the member. The key top member of the fifth embodiment utilizes this optical phenomenon of the resinous member including a fluorescent material.

In the key top member of the fifth embodiment, external light from the ambient environment of the key top member is incident through the light transmittable upper parts 37 into the fluorescent part 38, and thus the fluorescent part 38 emits light brighter than the incident light. Then, most of the emitted light is reflected in a total internal reflection manner by relatively large major surfaces of the fluorescent part 38, including the upper and lower surfaces of the generally flat base section, to propagate through the fluorescent part 38, and is concentrically radiated from relatively small end surfaces of the fluorescent part 38, including the top surface 36 of the upwardly projecting section, exposed on the top surface of the key top member.

In this manner, the top surface 36 of the fluorescent part 38 is always visually observed as a highlighted surface brighter than the upper surface of the generally flat base section of the fluorescent part 38. Consequently, the top surface 36 of the fluorescent part 38, representing a character, is brighter than the adjacent upper surfaces of the light transmittable upper parts 37, and can be visually recognized in itself as a character "A". Therefore, the key top member of the fifth embodiment can improve the visibility of the character in a substantially dark place, i.e., so long as there is a little light in the ambient environment.

It should be noted that the efficiency of the propagation of light in the fluorescent part 38 is increased when the difference between the reflective index of the fluorescent part 38 and the reflective indexes of the base and upper parts 30, 37 is increased. In this respect, a reflecting layer (not shown) may be provided between the base part 30 and the fluorescent part 38, to increase the efficiency of the propagation of light in the fluorescent part 38.

Figure 9A:
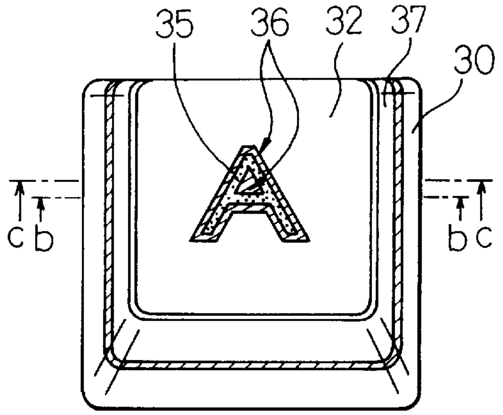
FIG. 9A is a plan view of a key top member with a character visually arranged therein, according to the sixth embodiment of the present invention.
Figure 9B:
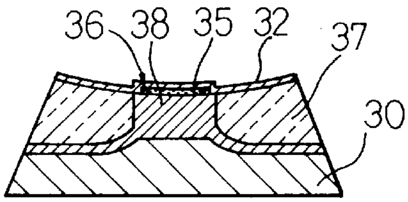
FIG. 9B is a vertical sectional view of the key top member, taken along line b—b of FIG. 9A.
Figure 9C:
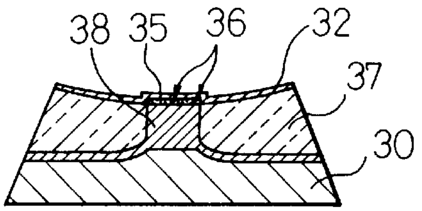
FIG. 9C is a vertical sectional view of the key top member, taken along line c—c of FIG. 9A.

FIGS. 9A to 9C show a key top member comprising a resinous body and a character visually arranged therein, according to the sixth embodiment of the present invention, which can improve the visibility of the character in a dark place. The key top member of the sixth embodiment includes a resinous molded base part 30, a fluorescent part 38 mounted on the upper surface of the base part 30, a light transmittable upper part 37 mounted on the fluorescent part 38, a character part 35 printed on the exposed top surface of the fluorescent part 38, and a light transmittable resinous coating 32 protectively covering the top surface of the key top member including the character part 35. The fluorescent part 38 is made of a molded resin including a fluorescent material such as a fluorescent dye. The light transmittable upper part 37 is made of a transparent or translucent molded resin.

The fluorescent part 38 includes a generally flat base section and an upwardly projecting section formed integrally with each other. The top surface 36 of the upwardly projecting section of the fluorescent part 38 is exposed on the upper surface of the light transmittable upper part 37, to represent a general figure similar to a character "A". The character part 35 has a configuration "A" slightly smaller than the top surface 36, and is arranged to partially intercept the light radiated from the top surface 36 of the fluorescent part 38.

In the key top member of the sixth embodiment, external light from the ambient environment of the key top member is incident through the light transmittable resinous coating 32 and the light transmittable upper part 37 into the fluorescent part 38, and thus the fluorescent part 38 emits light brighter than the incident light. Then, most of the emitted light is concentrically radiated from the top surface 36 of the fluorescent part 38, in the same manner as in the fifth embodiment. Since the top surface 36 of the fluorescent part 38 is partially covered by the character part 35, only the remaining portion of the top surface 36, surrounding the character part 35, is brightened in a fluorescent manner, and thus the character part 35 can be visually recognized as a dark character "A" with an optically highlighted profile. Therefore, the key top member of the sixth embodiment can improve the visibility of the character in a substantially dark place.

Similar to the fifth embodiment, a reflecting layer (not shown) may be provided between the base part 30 and the fluorescent part 38, to increase the efficiency of the propagation of light in the fluorescent part 38. Further, another reflecting layer (not shown) may be provided between the character part 35 and the top surface 36 of the fluorescent part 38. In this arrangement, the light reflected by the reflecting layer is radiated from the remaining portion of the top surface 36, surrounding the character part 35, and thereby enhances the improvement of the visibility of the character.

Figure 10A:
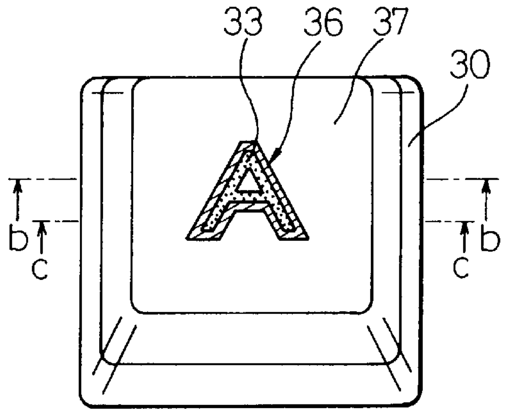
FIG. 10A is a plan view of a key top member with a character visually arranged therein, according to the seventh embodiment of the present invention.
Figure 10B:
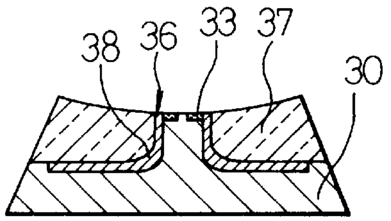
FIG. 10B is a vertical sectional view of the key top member, taken along line b—b of FIG. 10A.
Figure 10C:
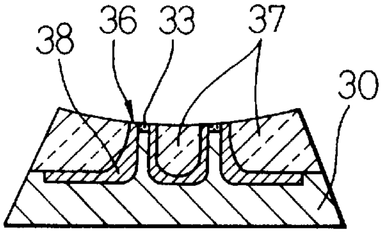
FIG. 10C is a vertical sectional view of the key top member, taken along line c—c of FIG. 10A.

FIGS. 10A to 10C show a key top member comprising a resinous body and a character visually arranged therein, according to the seventh embodiment of the present invention, which can improve the visibility of the character in a dark place. The key top member of the seventh embodiment includes a resinous molded base part 30, a fluorescent part 38 mounted on the upper surface of the base part 30, and a light transmittable upper part 37 mounted on the fluorescent part 38. The fluorescent part 38 is made of a molded resin including a fluorescent material such as a fluorescent dye. The light transmittable upper part 37 is made of a transparent or translucent molded resin.

The resinous molded base part 30 integrally includes an upwardly projecting portion, the top surface of which is exposed on the upper surface of the light transmittable upper part 37, to represent a general figure similar to a character "A". A darkened ridge 33, representing a character "A", is formed by a laser beam marking on the top surface of the base part 30. Thus, in the seventh embodiment, the base part 30 is made of a material containing a carbon.

The fluorescent part 38 includes a generally flat base section and an upwardly projecting section formed integrally with each other. The top surface 36 of the upwardly projecting section of the fluorescent part 38 is exposed on the upper surface of the light transmittable upper part 37, to be adjacent to the outer periphery of the darkened ridge 33 to surround the darkened ridge 33. The generally flat base section of the fluorescent part 38 does not reach the slanted lateral faces of the key top member.

In the key top member of the seventh embodiment, external light from the ambient environment of the key top member is incident through the light transmittable upper parts 37 into the fluorescent part 38, and thus the fluorescent part 38 emits light brighter than the incident light. Then, most of the emitted light is concentrically radiated from the top surface 36 of the fluorescent part 38, in the same manner as in the fifth and sixth embodiments. The top surface 36, surrounding the darkened ridge 33, is brightened in a fluorescent manner, and thus the darkened ridge 33 can be visually recognized as a dark character "A" with an optically highlighted profile. Therefore, the key top member of the seventh embodiment can improve the visibility of the character in a substantially dark place.

Similar to the fifth embodiment, a reflecting layer (not shown) may be provided between the base part 30 and the fluorescent part 38. Further, a light transmittable resinous coating (not shown) may be mounted on the top surface of the key top member, for protectively covering the top surface and the darkened ridge 33.

Figure 11A:
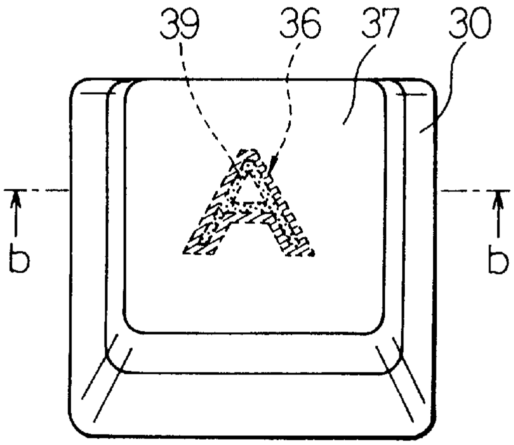
FIG. 11A is a plan view of a key top member with a character visually arranged therein, according to the eighth embodiment of the present invention.
Figure 11B:
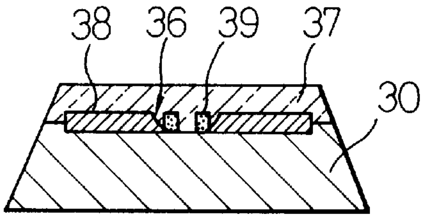
FIG. 11B is a vertical sectional view of the key top member, taken along line b—b of FIG. 11A.

FIGS. 11A and 11B show a key top member comprising a resinous body and a character visually arranged therein, according to the eighth embodiment of the present invention, which can improve the visibility of the character in a dark place. The key top member of the eighth embodiment includes a resinous molded base part 30, a fluorescent part 38 mounted on the upper surface of the base part 30, a character part 39 arranged adjacent to the fluorescent part 38 on the upper surface of the base part 30, and a light transmittable upper part 37 mounted to cover the base part 30, the fluorescent part 38 and the character part 39. The fluorescent part 38 is made of a molded resin including a fluorescent material such as a fluorescent dye. The light transmittable upper part 37 is made of a transparent or translucent molded resin. The character part 39 is made of a dark colored resinous plate.

Figure 12A:
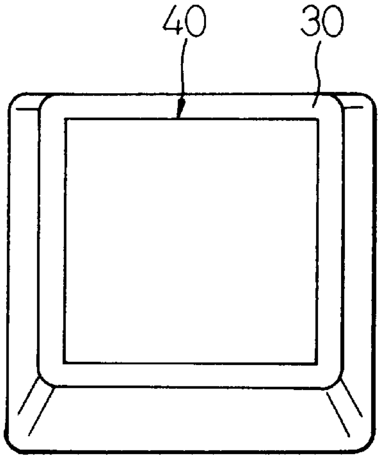
FIG. 12A is a plan view of a resinous molded base part of the key top member of FIG. 11A.
Figure 12B:
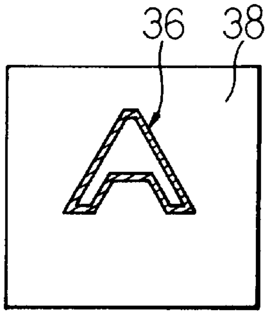
FIG. 12B is a plan view of a fluorescent part of the key top member of FIG. 11A.
Figure 12C:
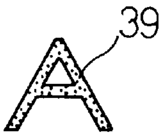
FIG. 12C is a plan view of a character part of the key top member of FIG. 11A.

As shown in FIG. 12A, the resinous molded base part 30 is provided with a recess 40 for receiving the fluorescent part 38. As shown in FIG. 12B, the fluorescent part 38 is shaped as a rectangular plate, the outer edge of which is fitted into the recess 40. Also, the fluorescent part 38 is provided with a center bore having a shape of a general figure similar to a character "A", and the end surface of the fluorescent part 38, defining the center bore, is formed as an upwardly facing slanted surface 36. The character part 39 having a shape "A" (see FIG. 12C) is fitted into the center bore, and thus the slanted surface 36 of the fluorescent part 38 is arranged adjacent to the outer periphery of the character part 39 to surround the character part 39. The light transmittable upper part 37 is molded on the thus assembled structure of the base part 30, the fluorescent part 38 and the character part 39.

In the key top member of the eighth embodiment, external light from the ambient environment of the key top member is incident through the light transmittable upper parts 37 into the fluorescent part 38, and thus the fluorescent part 38 emits light brighter than the incident light. Then, most of the emitted light is concentrically radiated from the slanted surface 36 of the fluorescent part 38, in the same manner as in the seventh embodiment. The slanted surface 36, surrounding the character part 39, is brightened in a fluorescent manner, and thus the character part 39 can be visually recognized as a dark character "A" with an optically highlighted profile. Therefore, the key top member of the eighth embodiment can improve the visibility of the character in a substantially dark place.

In the above embodiments of the key top member, the fluorescent part 38 may be molded from a resinous material, such as an acrylic resin or a polycarbonate resin, into which a fluorescent dye, such as a perylene or a rhodamine, is included. However, any other suitable materials may be used for the fluorescent part 38.

As will be understood from the above description, the key top member according to the present invention can improve the visibility, in a dark place, of the character formed on the member, and can be effectively used for a key in a keyboard of not only a portable electronic machine but also any other electronic machines installed under a poor light condition, to facilitate the operation of the machine. Further, the key top member according to the present invention does not use an electrically powered light source, and therefore, can provide a power-saving, small sized, low cost keyboard or terminal unit.

While the invention has been particularly shown and described with reference to preferred embodiments thereof, it will be understood by those skilled in the art that various changes and modifications may be made without departing from the spirit and scope of the invention. The scope of the invention is therefore to be determined solely by the appended claims.

What is claimed is:

1. A resinous member with a character visually arranged therein, comprising:

a body made of a resin;

a character formed by a laser beam machining on a surface of said body; and a light transmittable coating arranged on said surface of said body for covering at least said character, said light transmittable coating being provided with a generally uniform thickness to form a roughened outer surface substantially corresponding to a machined surface of said character.

2. A resinous member as claimed in claim 1, wherein said character is structured as a groove engraved by said laser beam machining.

3. A resinous member as claimed in claim 1, wherein said character is structured as a darkened ridge burnt by said laser beam machining.

4. A resinous member as claimed in claim 1, wherein said light transmittable coating is formed through a spray coating process.

5. A resinous member as claimed in claim 1, wherein said light transmittable coating is made of an ultraviolet-curing resin.

6. A key top member comprising a resinous member as claimed in claim 1.

7. A key top member with a character visually arranged therein, comprising:

a body made of a resin;

a character arranged on a surface of said body; and optical means for highlighting said character using an external light.

8. A key top member as claimed in claim 7, wherein said optical means comprises a phosphorescent member disposed adjacent to and around said character to highlight a profile of said character.

9. A key top member as claimed in claim 8, wherein said character is printed on said surface of said body, and wherein said phosphorescent member is mounted on said surface of said body to surround at least an outer periphery of said character.

10. A key top member as claimed in claim 8, wherein said character is structured on said surface of said body as a darkened ridge burnt by a laser beam machining, and wherein said phosphorescent member is mounted on said surface of said body to surround at least an outer periphery of said character.

11. A key top member as claimed in claim 8, further comprises a light transmittable coating arranged on said surface of said body for covering at least said character and said phosphorescent member.

12. A key top member as claimed in claim 7, wherein said optical means comprises a fluorescent member disposed within said body, said fluorescent member being provided with major surfaces covered by said body and end surfaces smaller than said major surfaces, wherein at least a part of said body, having said surface of said body, is formed as a light transmittable part enabling said external light to be incident into said fluorescent member through at least one of said major surfaces, and wherein at least one of said end surfaces acts to highlight said character.

13. A key top member as claimed in claim 12, wherein said at least one of said end surfaces of said fluorescent member is exposed on said surface of said body to be visually recognized as said character.

14. A key top member as claimed in claim 12, wherein said at least one of said end surfaces of said fluorescent member is exposed on said surface of said body, and wherein said character is arranged on or adjacent to said exposed at least one of said end surfaces to be visually recognized as a dark character with a profile thereof being highlighted.

15. A key top member as claimed in claim 14, further comprises a light transmittable coating arranged on said surface of said body for covering at least said character and said exposed at least one of said end surfaces of said fluorescent member.

16. A key top member as claimed in claim 12, wherein said at least one of said end surfaces of said fluorescent member is covered by said light transmittable part of said body, and wherein said character is arranged adjacent to said covered at least one of said end surfaces to be visually recognized as a character with a profile thereof being highlighted.

17. A key body with a character visually arranged therein, comprising:

a character formed by a laser beam machining on a surface of said key body; and a generally uniform light transmittable coating arranged on said machined surface for highlighting said character using an external light.

18. A method of making a key body with a character visually arranged therein, comprising:

machining a character on a surface of said key body by a laser beam;

applying a generally uniform light transmittable coating on said machined surface so that said character can be highlighted using an external light.

* * * * *